Nov. 22, 1938.   Z. E. KEOUGH   2,137,672
SAFETY LANDING DEVICE FOR AIRPLANES
Filed May 12, 1937   4 Sheets-Sheet 1
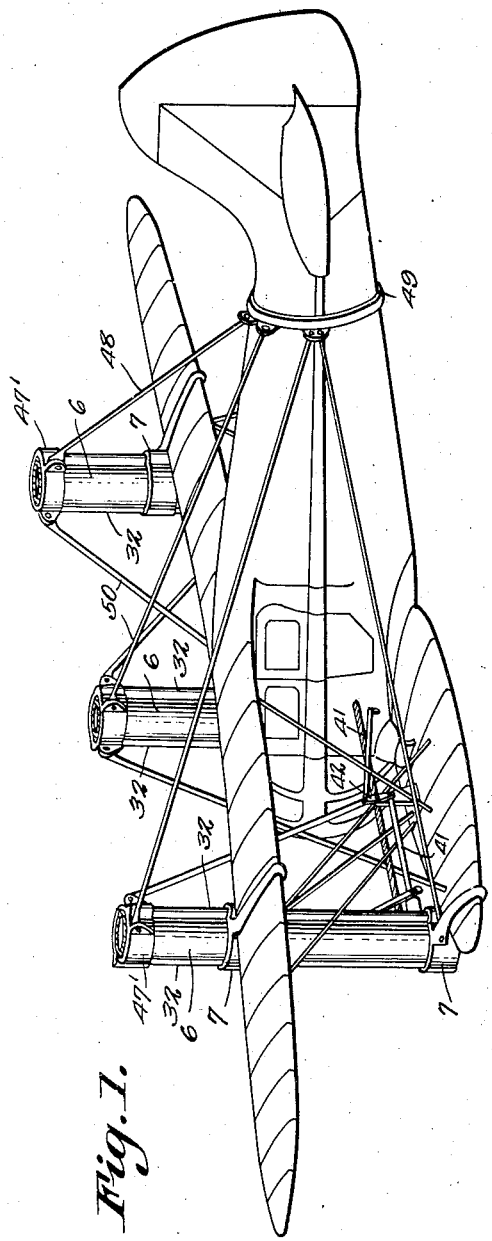
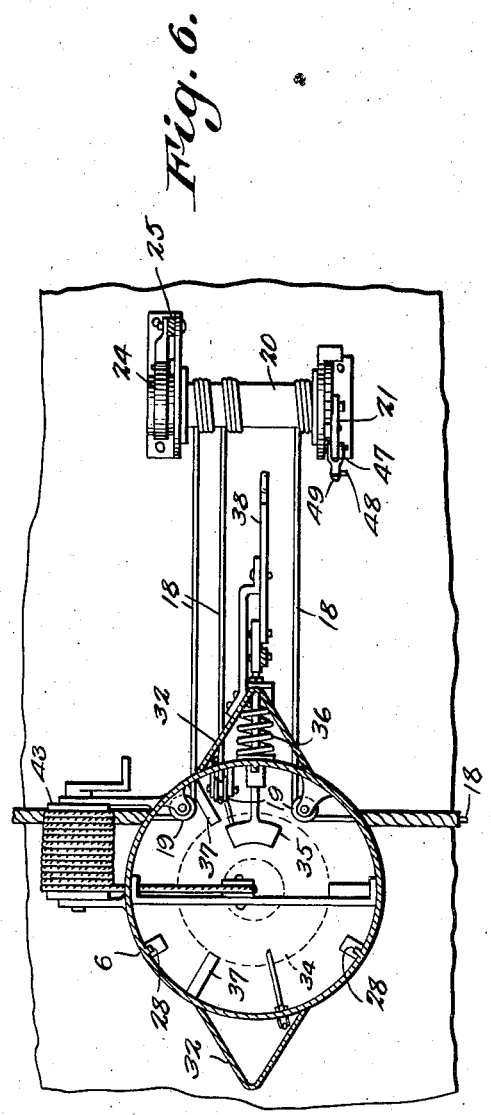
Inventor
Z. E. Keough
By CASnow&Co.
Attorneys.

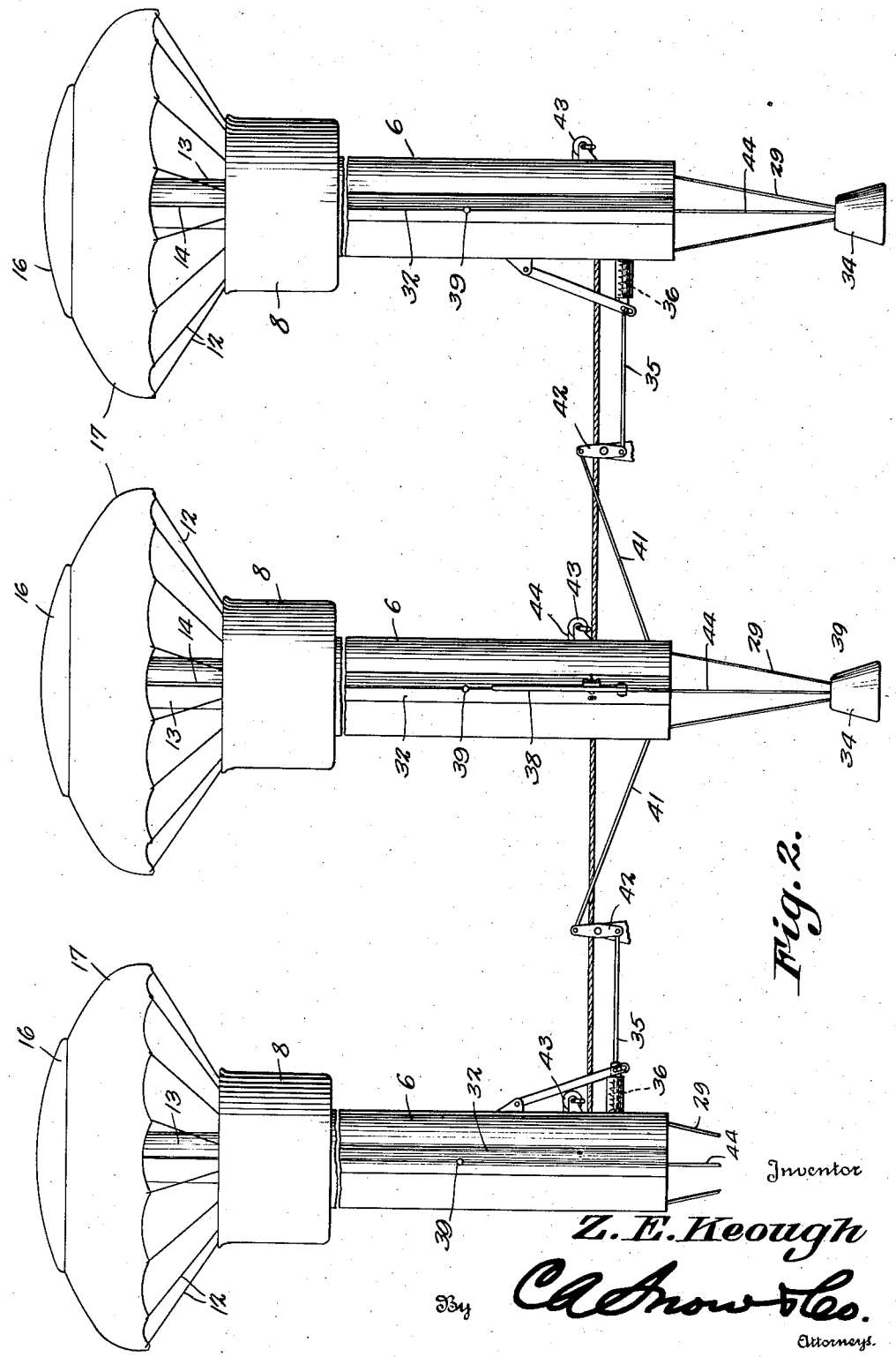

Nov. 22, 1938.  Z. E. KEOUGH  2,137,672
SAFETY LANDING DEVICE FOR AIRPLANES
Filed May 12, 1937  4 Sheets-Sheet 3

Inventor
Z. E. Keough
By CASnow&Co.
Attorneys.

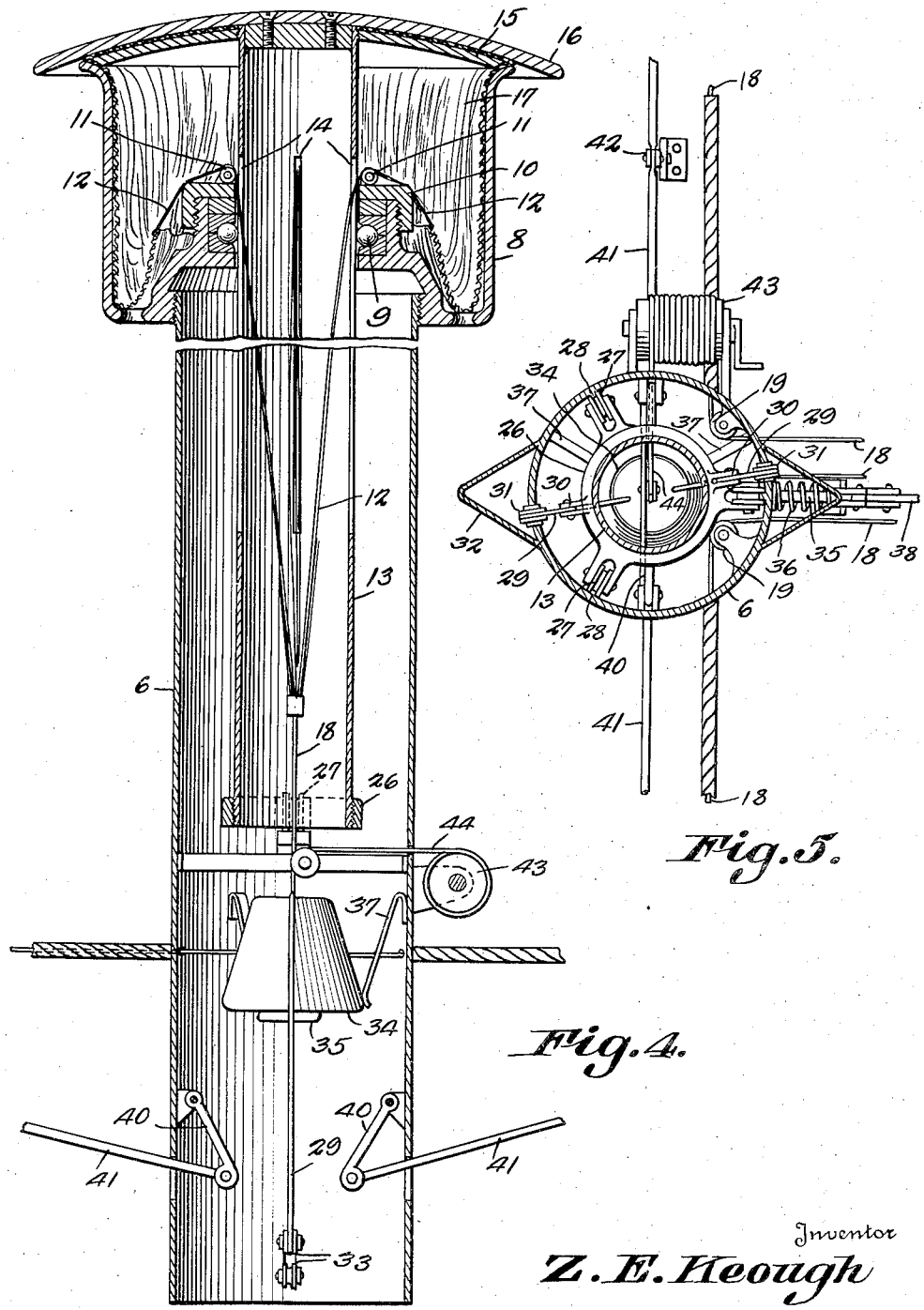

Patented Nov. 22, 1938

2,137,672

UNITED STATES PATENT OFFICE 2,137,672

SAFETY LANDING DEVICE FOR AIRPLANES

Zachariah E. Keough, Mansfield, Ohio

Application May 12, 1937, Serial No. 142,266

6 Claims. (Cl. 244—139)

This invention embodies a landing device designed for use on airplanes, dirigibles or the like, the primary object of the invention being to provide means controlled by the pilot of the machine, for retarding the downward movement of a disabled aircraft, insuring a safe landing for the occupants or passengers of the aircraft.

An important object of the invention is the provision of a device of this character which may be readily and easily operated by the pilot of the aircraft, the operation of the device being controlled by a lever arranged in close proximity to the pilot's seat.

Another object of the invention is to provide a plurality of parachutes, mounted on the aircraft in such a way that they will operate freely and will move to their active or supporting positions with the minimum amount of resistance, insuring the operation of the device under abnormal air conditions.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a perspective view of an airplane equipped with landing devices, constructed in accordance with the invention.

Figure 2 is a view illustrating a plurality of landing devices as positioned on an airplane, and illustrating the relative positions of the landing devices.

Figure 4 is a longitudinal sectional view through the landing device, illustrating the parachute as folded within the upper end of the housing.

Figure 5 is a sectional view taken on line 5—5 of Figure 3.

Figure 6 is a sectional view taken on line 6—6 of Figure 3.

Figure 3:
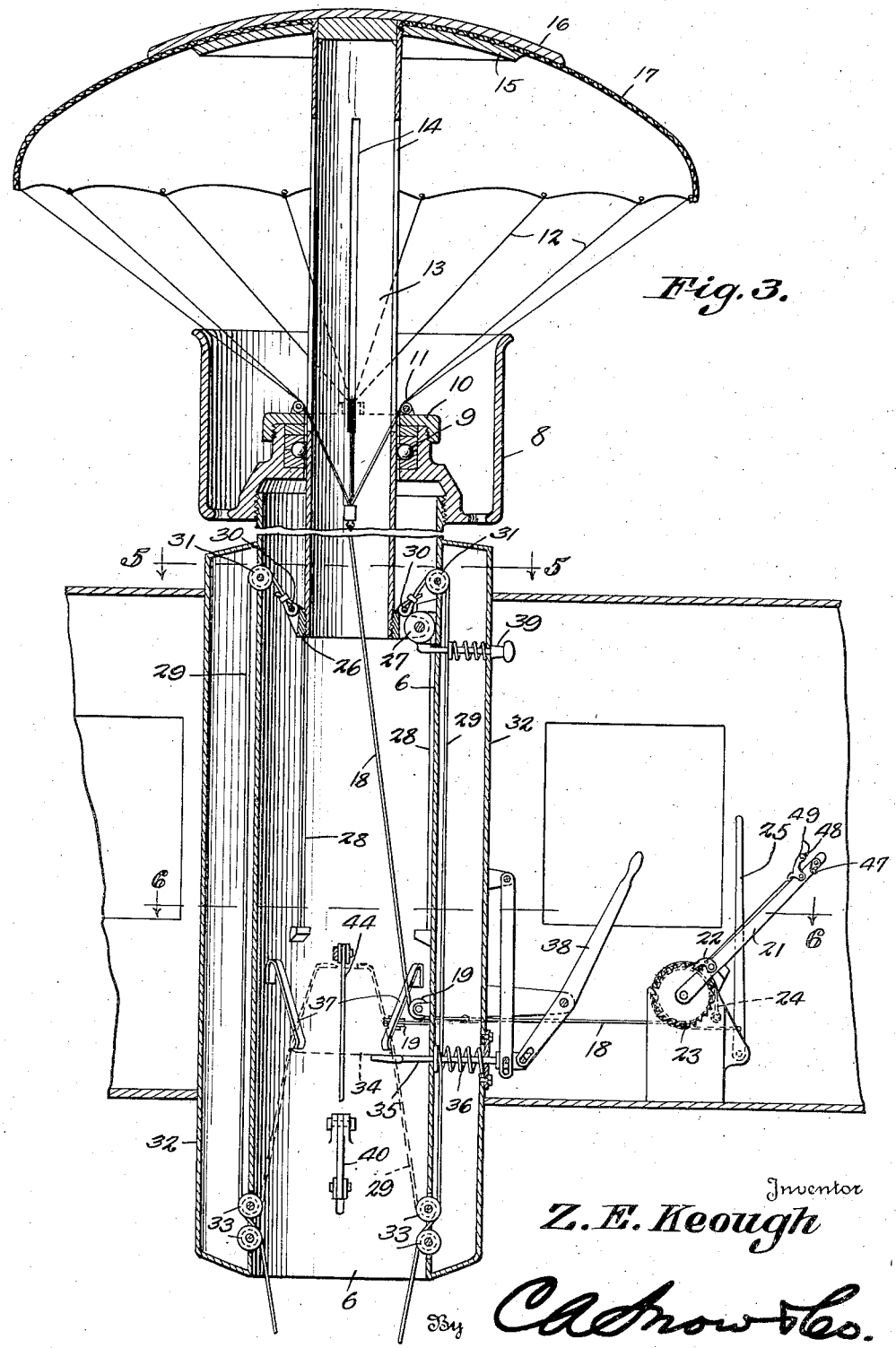
Figure 3 is a longitudinal sectional view through a landing device constructed in accordance with the invention, and illustrating the parachute as in its extended or supporting position.

Referring to the drawings in detail, an airplane is indicated generally by the reference character 5, and on which the landing devices constructed in accordance with the invention, are mounted.

These landing devices are indicated generally by the reference character 6, and since the constructions of the landing devices are identical, only one of the landing devices will be described in detail. As shown, the landing devices which are mounted at the forward edges of the wings of the airplane, are secured to the airplane by means of the straps 7, which embrace portions of the tubular housings of the landing devices, as clearly shown by Figure 1 of the drawings.

Secured to the upper end of each tubular housing 6, is an enlarged casing indicated by the reference character 8, the upper edge thereof being open and flared, to receive the parachute, to be hereinafter more fully described, when the parachute is in its inactive position.

The inner portion of the casing 8, extends upwardly, and is formed with a recess to receive the ball bearings 9, there being provided a disk 10 threaded on the upwardly extended portion of the casing 8, securing the ball bearings in place. Rollers indicated by the reference character 11 are mounted on the disk, and afford means for guiding the flexible members 12, which connect with the fabric of the parachute, into the projecting tube indicated by the reference character 13.

This projecting tube, operates through the ball bearings 9, as clearly shown by Figure 3 of the drawings, and is of a length to extend an appreciable distance above the tubular housing, in which it operates. Elongated openings 14 are formed in the projecting tube 13, so that the flexible member 12, may extend into the projecting tube. At the upward end of the projecting tube, is a curved disk-like crown plate 15 formed with a beveled edge to fit the flared upper extremity of the casing 8, and insure a close fit between the crown plate and casing 8. Above the crown plate, is a cover plate, indicated by the reference character 16, the crown plate and the cover plate being so constructed that they securely clamp the fabric of the parachute 17 therebetween, securing the fabric to the projecting tube.

The flexible members 12 connect with the flexible member or cable 18, which extends downwardly into the tubular housing, and passes laterally through an opening in the tubular housing, over the pulley 19, from where it is wound on the drum 20. The drum 20 is operated by means of the lever 21 supplied with a pawl 22 operating over the ratchet 23, secured at one end of the drum. Inasmuch as there are several landing devices used on an airplane, and in the present showing three have been illustrated, it might be stated that cables corresponding to the cable 18 in Figure 3 of the drawings, and which control the operation of the various parachutes, extend through the central tubular housing, and are also wound on the drum, to the end that the parachutes of all of the landing devices are operated simultaneously.

The reference character 24, designates a brake of the friction band type, which is operated by means of the lever 25, for holding the drum against reverse movement, while the lever 21 is being operated to wind the flexible members or cables on the drum. When it is desired to release the parachutes, this may be accomplished by releasing the lever 21, and gradually decreasing the pressure on the brake 24, allowing the parachute to be extended. It will also be seen that due to this construction, the opening of the parachute while it is positive, may be readily controlled to the end that they may open gradually, relieving the ship and its occupants of severe strain, caused by the ship jarring.

At the lower end of the projecting tube 13, is a collar indicated by the reference character 26, which collar is provided with pairs of spaced ears between which the rollers 27 are mounted, the rollers being of the grooved type, and positioned to operate over the tracks 28 that are secured to the inner surface of the housing. This construction insures a true vertical movement of the projecting tubes at all times, preventing binding to retard movement of the projecting tube.

Cables indicated by the reference character 29, are connected with the collar 26, at 30, and pass over the pulleys 31 mounted in openings formed in the housing 6, near the upper end thereof. These cables extend through streamline housings arranged longitudinally of the housing 6, and indicated by the reference character 32, so that the cables 29 are completely housed at all times and protected against the elements.

Pairs of pulleys indicated at 33 are mounted near the lower end of the tubular housing, and the cables 29 operate over these pairs of pulleys 33, as clearly shown by Figure 3 of the drawings. A weight indicated by the reference character 34 is connected to the cables 29, and is normally held in its inactive position within the tubular housing, by means of the draw bar 35, which extends through the side wall of the tubular housing, the draw bar being provided with a coiled spring 36 for normally urging the draw bar to its active or supporting position. Spring arms indicated by the reference character 37 are secured within the tubular housing, and extend inwardly to contact with the weight 34, holding the weight in perfect balance within the tubular housing.

The draw bar 35 is operated by means of the lever 38, which has connection therewith, and is disposed in proximity to the pilots seat, so that the pilot will have easy access thereto. A latch member indicated by the reference character 39, extends into the tubular housing, and is adapted to engage under one of the rollers 27, to hold the projecting tube and its parachute in their extended positions. The operator may by pulling the latch member 39, release the projecting tube so that it may be returned to its normal inactive position within the tubular housing.

In the present showing, three landing devices have been used, a central landing device, and a right and left landing device. The central landing device is equipped with pivoted bars 40 that extend inwardly from the wall of the tubular housing, the members 40 normally lying in the path of travel of the weight 34.

Connected with the pivoted members 40, are connecting links 41 that have pivotal connection with the levers 42 that are mounted on the frame of the airship. These levers 42 have pivotal connection with the draw bars 35 of the right and left landing devices. It follows that when the weight 34 of the central landing device, has been operated to release the projecting tube and parachute, the weight 34 will pass downwardly contacting with the pivoted members 40, moving the pivoted members 41 to operate the levers 42 and consequently operate the draw bars 35 releasing the weights 34 within the right and left landing devices of the assembly.

A windlass indicated by the reference character 43 is supported on each tubular housing, at a point near the normal position of the weight 34, mounted therein. A cable indicated by the reference character 44, operates over the windlass, and extends through an opening in one wall of the tubular housing, where it operates over the pulley 46, from where it connects with the weight.

From the foregoing it will be seen that when it is desired to return the parachutes to their inactive or folded positions, each cable 44 may be operated or wound on its windlass, moving the weight to its dotted line position, as shown by Figure 3. It might be further stated that each tubular housing is supplied with a windlass of this character for operating the weight thereof.

As shown by Figure 3 of the drawings, a pivoted latch 47 is carried at the upper end of the lever 21, and is adapted to be moved over the pin 48 of the lever 49, so that the lever 49 may be held to disengage the pawl 22 and ratchet 23, so that the drum 20 will be free to rotate and release the cable 18, when the weights 34 have been operated to project the tubes 13.

In addition to the straps 7 for securing the landing devices to the wings of the airplane, collars indicated by the reference character 47', are provided at the ends of the tubular housings, to which collars brace rods 48 are connected. The brace rods 48 extend to the band 49 which is secured to the body portion of the airship, at a point near the rear end thereof.

Brace rods 50 also connect with the collars 47, and are secured near the forward portion of the body of the airplane, further bracing the landing devices against lateral movement under wind pressure.

The operation of the device is as follows: Assuming that the parachutes are in their closed positions, or in positions as shown by Figure 4 of the drawings, and it is desired to release the parachutes to retard the downward movement of the airplane, in case of an emergency. The operator pulls the lever 38, releasing the weight 34 in the central landing device. The weight 34 will now fall downwardly through the bottom of the tubular housing, and assume a position as shown by Figure 2 of the drawings. With the downward movement of the weight, the pivoted members 40 are operated to move the links 41 and levers 42 with the result that the draw bars in the lateral landing devices, are operated in a manner as described, releasing the weights in the lateral landing devices.

It will be obvious that as the weights move to their active positions as shown by Figure 2 of the drawings, the projecting tubes are extended above the upper ends of the tubular housings, and the parachutes open to positions as shown by Figure 2.

Should it be desired to decrease the diameters of the parachutes, it is only necessary to hold the drum 20 against movement, while the lever 21 is operated to a position where it may be moved to wind the flexible member or cable thereon. In this way the operator will have complete control over the parachutes, and may increase or diminish the sizes thereof for complete control of the landing devices.

Having thus described the invention, what is claimed is:

1. A safety landing device for aircraft, comprising a tubular housing adapted to be mounted on an aircraft, a projecting tube slidably mounted within the housing, a parachute, means for securing the parachute at the outer end of the projecting tube whereby movement of the projecting tube to its extended position operates to release the parachute to the action of the air, a weight normally held suspended within the tubular housing, cables connecting the weight to the projecting tube, and manually controlled means for releasing the weight to move the projecting tube to its extended position.

2. A safety landing device for aircraft, comprising a tubular housing adapted to be secured to an aircraft, a projecting tube slidably mounted in the housing, a parachute mounted in the upper end of the projecting tube, a weight within the housing, cables connected with the weight and extending to a point adjacent to the upper end of the housing, said cables being connected with the lower end of the projecting tube whereby the tube will be extended from the housing when the weight is released, manually controlled means for releasing the weight and said parachute adapted to be released when the projecting tube moves to its extended position.

3. A safety landing device for aircraft, comprising housings adapted to be secured to an aircraft, a projecting tube slidably mounted within each housing, parachutes, means for securing the projecting tubes to the central portions of the parachutes, cables connected with the parachutes and extending through the upper ends of the housings, a drum on which the cables are wound, means for operating the drum controlling the opening and closing action of the parachutes simultaneously, and weight-controlled means for extending the projecting tubes and parachutes to their active position.

4. A safety landing device for aircraft, comprising a central tubular housing and lateral tubular housings, a projecting tube slidably mounted in each housing, a parachute mounted at the upper end of each projecting tube, weight controlled means for extending the projecting tubes and parachutes to their extended positions, manually controlled means for operating the weight controlled means in the central tubular housing, and means controlled by the weight controlled means of the central tubular housing for releasing the weights of the lateral housings extending the projecting tubes and parachutes thereof.

5. A safety landing device for aircraft comprising housings adapted to be secured to an aircraft, a projecting tube slidably mounted within each housing, a parachute secured to the outer end of each projecting tube, said projecting tubes having elongated openings formed therein, cables controlling the opening of the parachutes, said cables passing through the elongated openings and into the housings, and means for operating the cables to control the opening of the parachutes.

6. A safety landing device for aircraft, comprising a tubular housing secured to an aircraft and said housing having an enlarged upper end portion, a projecting tube slidably mounted within the housing, a crown plate and cover plate secured to the projecting tube to move therewith, a fabric material secured between the crown plate and the cover plate providing a parachute, said crown plate fitting against the lower side of the fabric material and being of a diameter to fit within and form a closure for the enlarged end of the housing, mechanical means for extending the projecting tube beyond the end of the housing whereby the parachute is moved to its active position, and said cover plate being of a diameter greater than the crown plate and adapted to close the enlarged end of the housing when the parachute is folded.

ZACHARIAH E. KEOUGH.